Nov. 6, 1945.   A. KROMHOUT   2,388,268
MULTIPORT ROTARY VALVE
Filed Nov. 6, 1942   6 Sheets-Sheet 1

Nov. 6, 1945.　　　A. KROMHOUT　　　2,388,268
MULTIPORT ROTARY VALVE
Filed Nov. 6, 1942　　　6 Sheets-Sheet 4

Inventor:
Andrew Kromhout
By McCanna, Wintercorn & Morsbach
Attys.

Nov. 6, 1945.    A. KROMHOUT    2,388,268
MULTIPORT ROTARY VALVE
Filed Nov. 6, 1942    6 Sheets-Sheet 5

Inventor:
Andrew Kromhout
By McCanna, Wintercorn & Morsbach
Attys.

Inventor:
Andrew Kromhout
By
McCanna, Wintercorn & Morsbach
Attys.

Patented Nov. 6, 1945

2,388,268

UNITED STATES PATENT OFFICE 2,388,268

MULTIPORT ROTARY VALVE

Andrew Kromhout, Elgin, Ill., assignor to Elgin Softener Corporation, Elgin, Ill., a corporation of Illinois Application November 6, 1942, Serial No. 464,744

7 Claims. (Cl. 277—19)

This invention relates to a new and improved multi-port rotary valve, and has for its principal object the provision of a valve of the kind mentioned retaining all of the advantages of a rotary plate type multi-port valve without the serious objection of scoring, and, compared with the lift plate type, without the serious objection of water hammer in the operation of the valve from one position to another.

Among the more important features of the valve of my invention may be mentioned the following:

(1) It has no metal to metal surface engagement; hence, leakage due to scoring or uneven expansion or contraction of metal surfaces in contact with one another is avoided.

(2) The incoming water can be completely shut off from the valve body, or other equipment attached thereto, without requiring additional manually, or otherwise, operated valves on the inflow side of the valve.

(3) The valve is so designed that it provides within itself an effective means of regulating the flow of hard water entering the inlet port, and, hence, special mechanical regulating devices are not required. Furthermore the valve also provides within itself means for regulating the flow of water through the ejector, which is an important advantage where the valve is used in connection with a zeolite water softener requiring brine solution of a certain strength for proper regeneration, and the valve also provides within itself means for regulating the proper flow of rinsing water and water for backwashing in connection with brine regeneration of a softener. Furthermore this valve is so designed that water can be cut off completely when the valve is turned to a certain position, thus permitting repairs or alterations to be made in the system or unit connected with the valve.

(4) The valve shoes on the rotor, which are preferably made of rubber but may be made of leather or other suitable substitute, are slidable on the cylindrical wall of the stator shell containing the valve ports, and are held seated under spring pressure so that there is automatic take-up for what little wear occurs on the relatively slidable parts. The valve is furthermore so designed that the valve shoes are held seated under water pressure and, therefore, do not rely entirely upon spring pressure thereon to prevent leakage. This arrangement is of advantage because the valve shoes in sliding over the seat surface wipe it clean and, because of the resilience of the material of the shoes themselves and the resilience of the springs used in connection therewith, any grit or foreign matter that might get between the co-acting surfaces will have an opportunity to become dislodged by being wiped off at the valve port openings.

(5) The hollow cylindrical shell containing the valve ports may be made of metal, metal lined with glass or other suitable, smooth, wear-resisting material, solid glass, or other suitable material. The valve rotor cooperating with the ported cylindrical surface of the shell has shoes of rubber or other non-metallic material, as stated before, capable of making good water-tight seals on the surface of the shell.

(6) The valve is so designed that hard water may be mixed with the zero soft water to deliver water to the service system having a desired degree of hardness, and it is further designed to permit bypassing hard water directly to the service system, if that is desired during the regeneration of the softener.

These and other features of the invention will all appear in the course of the following description, in which reference is made to the accompanying drawings, wherein—

Similar reference numerals are applied to corresponding parts throughout the views.

Figures 1, 2:
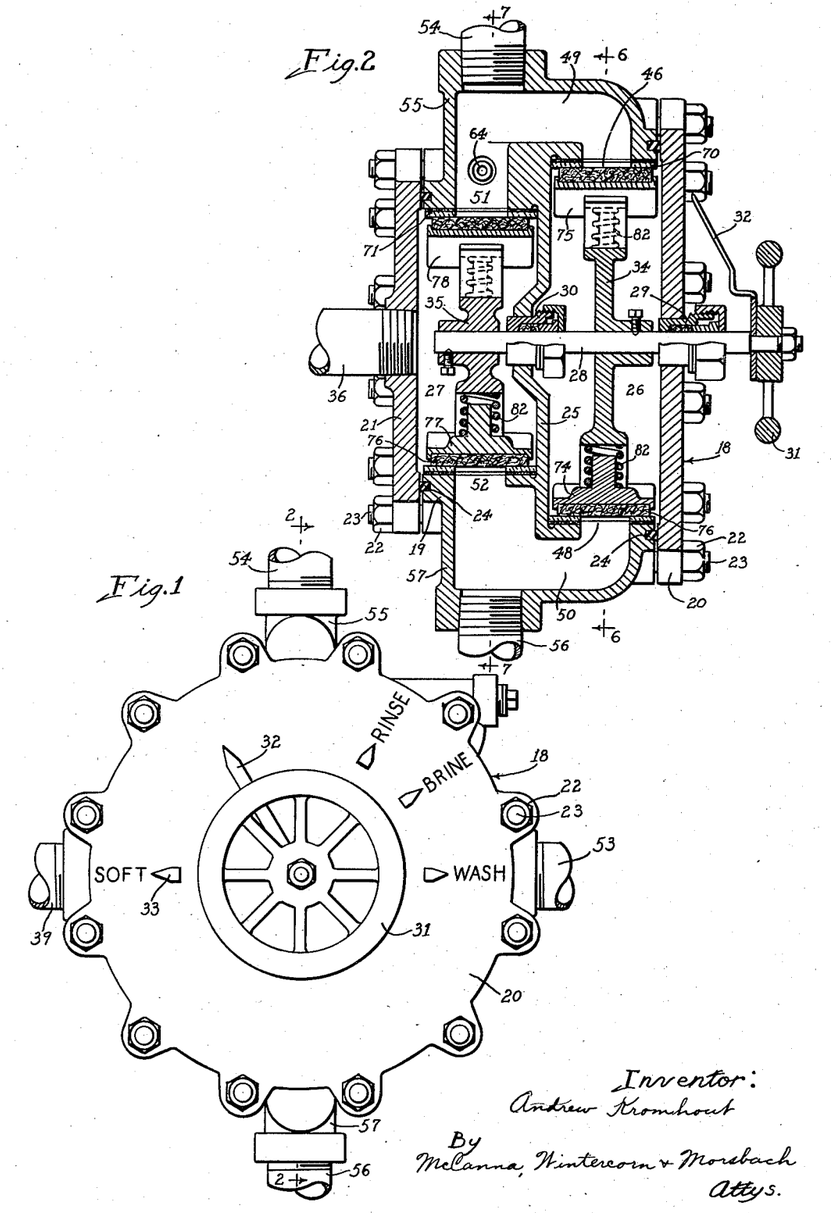
Figure 1 is a face view of the valve of my invention.
Fig. 2 is a cross-section on the line 2—2 of Fig. 1.

Referring first to Figs. 1 and 2, the valve of my invention has the body 18 thereof made in three parts, namely, a hollow generally cylindrical shell 19, a face plate 20, and back plate 21. The plates 20 and 21 are fastened in place by nuts 22 threading on studs 23 projecting from the shell. Compressible gasket rings 24 of rubber or other suitable, compressible, resilient material are entered in annular grooves in the opposite ends of the shell and project therefrom enough for sealing contact with the plates 20 and 21. A partition wall 25 in the middle of the shell divides it transversely into two chambers, the front chamber 26 being for softened water and the rear chamber 27 being for raw water. A shaft 28 is rotatable in the stuffing boxes 29 and 30 in the face plate 20 and partition wall 25, respectively, and has a hand wheel 31 secured on the outer end thereof together with a pointer 32 to indicate the different positions of rotary adjustment of the valve, there being index marks 33 on the face plate 20 in the case of a valve used in connection with a zeolite water softener, marking the different valve positions, "soft" for the softening or service position, "wash" for the backwash position, "brine" for the brining position, and "rinse" for the rinsing position. The valve may be turned in a counter-clockwise direction from the soft or service position through the three other positions and back to the soft or service position in a cycle of operation of the water softener in connection with which the valve is used. The shaft 28 has two spiders 34 and 35 secured thereon, rotatable in the chambers 26 and 27, to move valve shoes relative to ports provided in circumferentially spaced relation in the cylindrical side walls of the shell 19, whereby to establish different flows through the valve and softener connected therewith.

Figure 3:
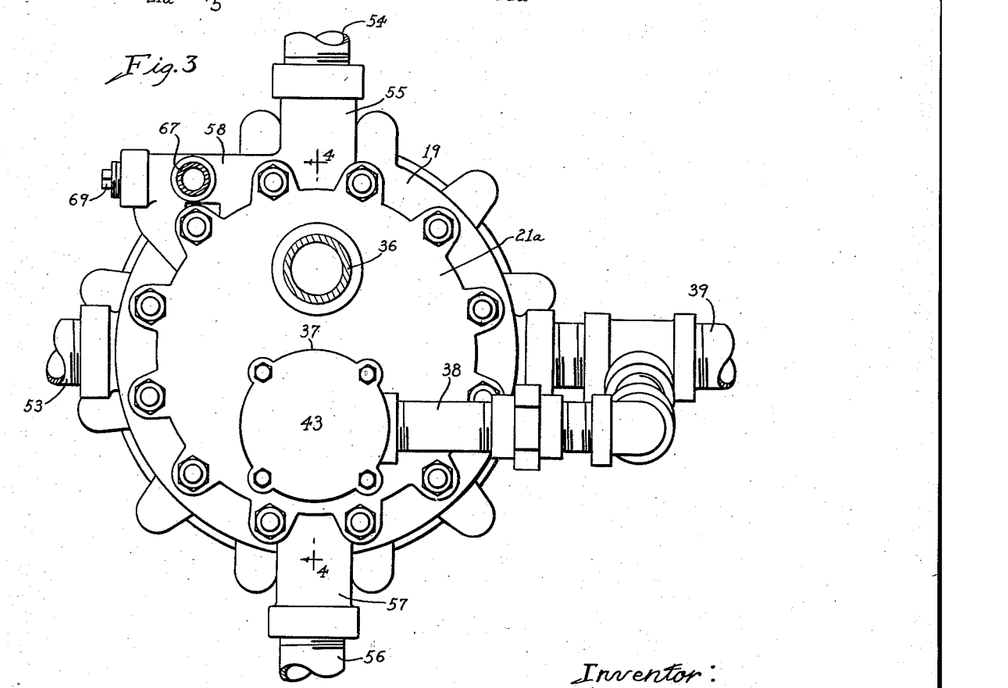
Fig. 3 is a rear view of a valve similar to that shown in Figs. 1 and 2 but including a by-pass.
Figures 6, 7, 8:
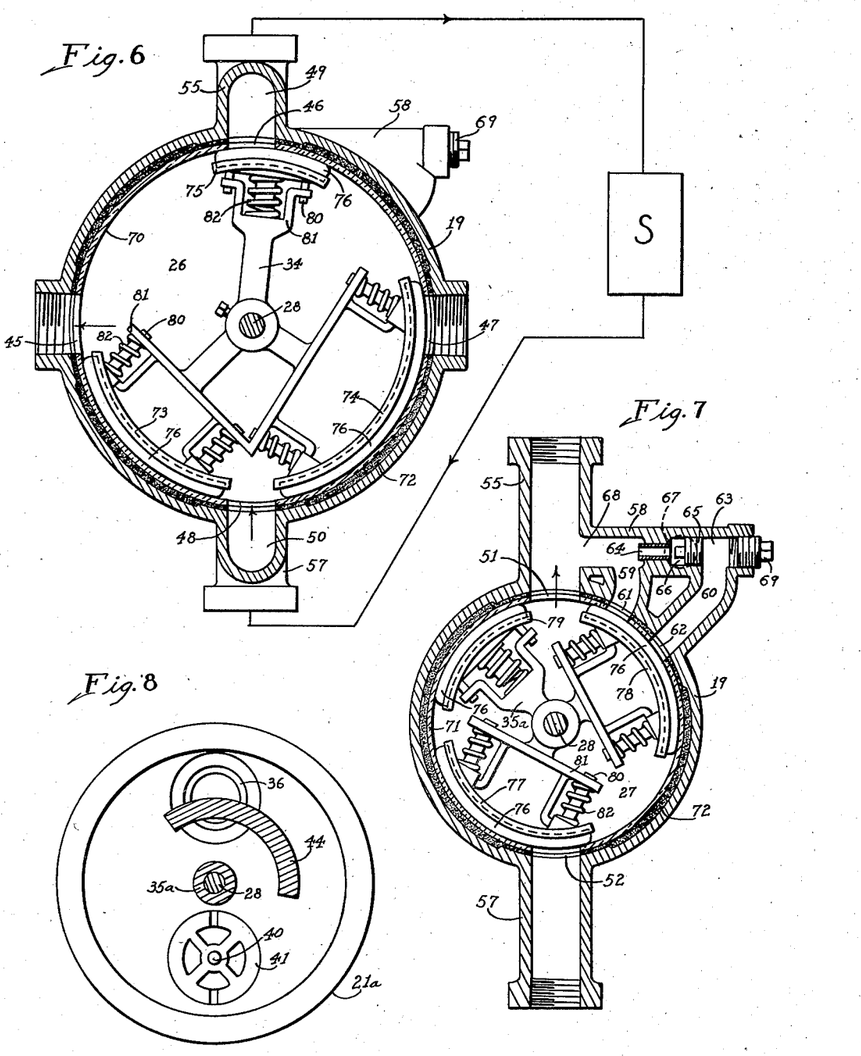
Figs. 6 and 7 are sections of the valve of Fig. 3 taken in the planes of the lines 6—6 and 7—7 in Fig. 2, these portions of the two valves of Figs. 1 and 3 being alike.
Fig. 8 is a view similar to Fig. 5, showing the position of the by-pass cam when the valve is in the service position as illustrated in Figs. 6 and 7.

The valve of Figs. 1 and 2 is the same as the valve shown in Figs. 3, 6, and 7 in so far as the shell 19 and face plate 20 are concerned, as well as the shaft 28 and spider and other valve parts associated therewith. The valve of Fig. 3, however, has a different back plate 21a, thus, whereas the valve of Figs. 1 and 2 has the raw water inlet pipe 36 connected to the center of the back plate 21, the valve of Fig. 3 has the raw water inlet pipe 36 connected to its back plate 21a off center, the off center location being necessitated by the provision of a by-pass valve housing provided in the form of a boss 37 on the back plate 21a in spaced relation to the raw water inlet pipe. A by-pass connection is indicated at 38 between the boss 37 and the soft water outlet pipe 39 connected to the service system. A poppet valve 40 has its stem working in a combination valve seat and guide 41 in the back plate 21a, and a spring 42 seated against the inside of the cover plate 43 bears against the head of the valve 40 to urge this by-pass valve normally toward the seat 41. The spider 35a is the same as the spider 35, but includes an arcuate cam 44, which in certain positions of rotation of the shaft 28 unseats the by-pass valve 40 by sliding engagement with the end of the stem thereof. The port arrangement is otherwise the same in the two valves, so that Figs. 6 and 7 and related Figures 9 and 10, and so forth, may be considered as relating as much to the valve of Figs. 1 and 2 as to the valve of Figs. 3, 4 and 5.

The shell 19 has four ports 45, 46, 47, and 48, communicating with the chamber 26 and spaced 90° apart. The diametrically opposed ports 46 and 48 communicate through passages 49 and 50 with the diametrically opposed ports 51 and 52 communicating with the chamber 27. The soft water outlet pipe 39 communicates with the port 45, and a drain pipe 53 communicates with the port 47. A pipe 54 connected to the top of the softener tank is connected to the neck 55 communicating jointly with ports 46 and 51. Another pipe 56 extending from the bottom of the softener tank is connected with a neck 57 and communicates jointly with the ports 48 and 52.

A hollow boss 58 is formed on the side of the shell 19 and has two passages therein 59 and 60 leading to small ports 61 and 62 in the cylindrical wall of the shell. These ports communicate with the chamber 27 and are spaced circumferentially with respect to one another and with respect to the ports 51 and 52, as illustrated in Fig. 7. The boss has a longitudinal bore 63 communicating at the rear end with the passage 60 and at the front end with a nozzle 64. Another nozzle 65 disposed intermediate the ends of the bore 63 discharges into the nozzle 64 through a chamber 66 in the front end of the bore behind the nozzle 64. A neck 67 on the side of the boss 58 communicates with the chamber 66, and a brine supply inlet pipe (not shown) leading from a brine tank is connected with the neck 67 for delivery of brine to the valve, the brine being drawn through the pipe by siphon action when water under pressure is delivered through the nozzle 65 and discharged through the nozzle 64 and through passage 68 into the neck 55 and out through the pipe 54 leading to the top of the softener tank. The passage 68 communicates at its rear end with the passage 59 previously mentioned. A plug 69 closes the rear end of the passage 63 and can be removed for adjustment or replacement of the ejector nozzle 65.

The shell 19 is preferably lined with glass, as indicated at 70 and 71, although any other suitable non-metallic or composition material may be employed. The glass sleeve liners 70 and 71 may be molded to the form desired to provide ports in register with those in the shell and are cemented in place with a plastic water-proof cement 72 filled in around the liners, between the liners and the side walls of the shell. The spiders 34 and 35 or 35a operate rubber faced valve shoes slidably engaging the smooth inner surfaces of the liners 70 and 71 to open certain of the ports and close others. There are two long shoes 73 and 74 and a short shoe 75 on the spider 34, each faced with a pad 76 preferably of rubber, although leather or any other suitable material may be provided. There are two long shoes 77 and 78 and a shorter shoe 79 provided on the spider 35 or 35a, as the case may be, each equipped with a pad 76 preferably of the same material as that used on the shoes 73, 74, and 75. In each instance the shoe has pins 80 working in guides 81 on the spider and has one or more coiled compression springs 82 acting between the guide and shoe to urge the shoe radially outwardly into sealing engagement with the surface of the liner. The water pressure active against the inner faces of the shoes also tends to keep the shoes in much tighter sealing engagement with the liners. I may, if desired, provide means whereby the spring pressure on the valve shoes can be relieved before the shoes are moved from one position to another. However, the spring tension used is ordinarily light enough compared with the hydraulic pressure active on the shoes so that relief of the spring pressure is not considered important enough to warrant the complication of construction which the addition of that feature would necessitate. The fact that there is no metal to metal surface engagement avoids liklihood of leakage due to scoring or uneven expansion and contraction of the metal parts in contact with one another. Rubber facing on the valve shoes compensates for such liner irregularities as there may be in the surface of the liner, so that an accurately machined or ground surface is not necessary. Furthermore, any wear on the rubber facings is automatically compensated for by the springs 82. The fact that the liners are not an integral part of the shell is of advantage because it permits fairly easy replacement, if that is ever necessary. The shell itself is not an integral part of the valve body, and the same advantage as to easy replacement if necessary is gained. In the operation of the valve, the sliding of the rubber faced shoes over the inner surfaces of the liners 70 and 71 results in the wiping clean of the contacting surfaces, and inasmuch as the shoes are in spaced relation, any particles of grit or dirt wiped off the inner surfaces of the liners will be carried toward the ports and have an opportunity of being washed out. Any grit or foreign matter that happens to lodge temporarily between the rubber face portions of the shoes and the inner surfaces of the liners will not be apt to scratch the surfaces, due to the resilience of the rubber, but will temporarily imbed itself in the rubber and be released when reaching a valve port in the operation of the valve. There is also another important advantage gained by the sliding action of the valve shoes, and that is the fact that the valve ports are opened or closed gradually and evenly and, therefore, there is no likelihood of water hammer or shock, that having been an outstanding objection to the lift plate type of valve. A still further important advantage of the present construction and mode of operation lies in the fact that the valve shoes themselves provide an effective means of regulating the flow so that no other regulating devices are required. This is important not only in the regulation of the flow of hard water during softening operation, but also in the regulation of the flow of water through the ejector during regeneration, and in the regulation of the flow of water in rinsing and backwashing.

Figures 4, 5:
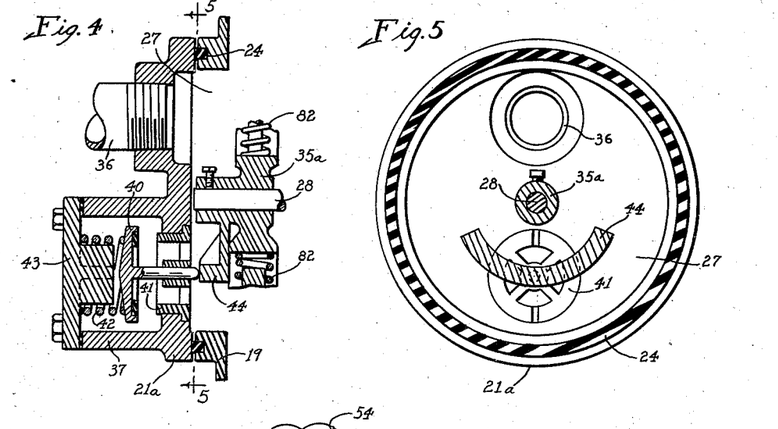
Fig. 4 is a sectional detail on the line 4—4 of Fig. 3.
Fig. 5 is a section on the line 5—5 of Fig. 4.

In operation, when the valve is in the service position illustrated in Figs. 6, 7, and 8, the raw water enters the chamber 27 in the valve through the pipe 36 and flows out through the port 51 and pipe 54 (Fig. 2) into the top of the softener S for passage downwardly through the bed of water softening material. The softened water leaving the bottom of the softener tank S returns to the valve through the pipe 56 (Fig. 2) and enters the chamber 26 through port 48, and flows out through the port 45 and pipe 39 (Fig. 1) to the service system. During this operation, the shoes 77 and 78, as shown in Fig. 7, keep all of the ports opening from chamber 27 closed except the port 51, and the shoes 74 and 75, as shown in Fig. 6, keep all of the ports opening from the chamber 26 closed except the ports 45 and 48. It is obvious that the water pressure in the chambers 26 and 27 will help to keep the shoes seated tightly over the ports that are closed thereby, although, of course, the spring pressure active on the shoes would be sufficient in itself. The fact that the water pressure is active to aid in holding the shoes seated makes it unnecessary to provide as heavy spring pressure as might otherwise be required, and with lighter spring pressure active on the shoes, there is proportionately less drag upon the operation of the valve. The valve may be either hand operated or power operated, the present design being particularly well suited to automatic operation due to the fact that there is only simple rotation of the shaft 28 in one direction, as distinguished from rotation first in one direction and then in the opposite direction, or as distinguished from endwise and rotary movement, common in the lift turn type of valve. During the softening operation, the cam 44 for operating the by-pass valve 40, shown in Fig. 4, is in the position shown in Fig. 8, remote in relation to the stem of the valve 40 projecting through the guide 41. The softening operation is, of course continued until the water softening material is exhausted and requires regeneration. The first step in the regeneration of a zeolite water softener is known as the backwash, in which the flow through the softener tank is reversed, so that in a downflow softener the foreign matter filtered from the water during the softening operation and left resting on the top of the bed in the form of a silt can be washed out and the bed of water softening material, packed during the downflow softening run, can be broken up and prepared for the brining.

Figures 9, 10, 11:
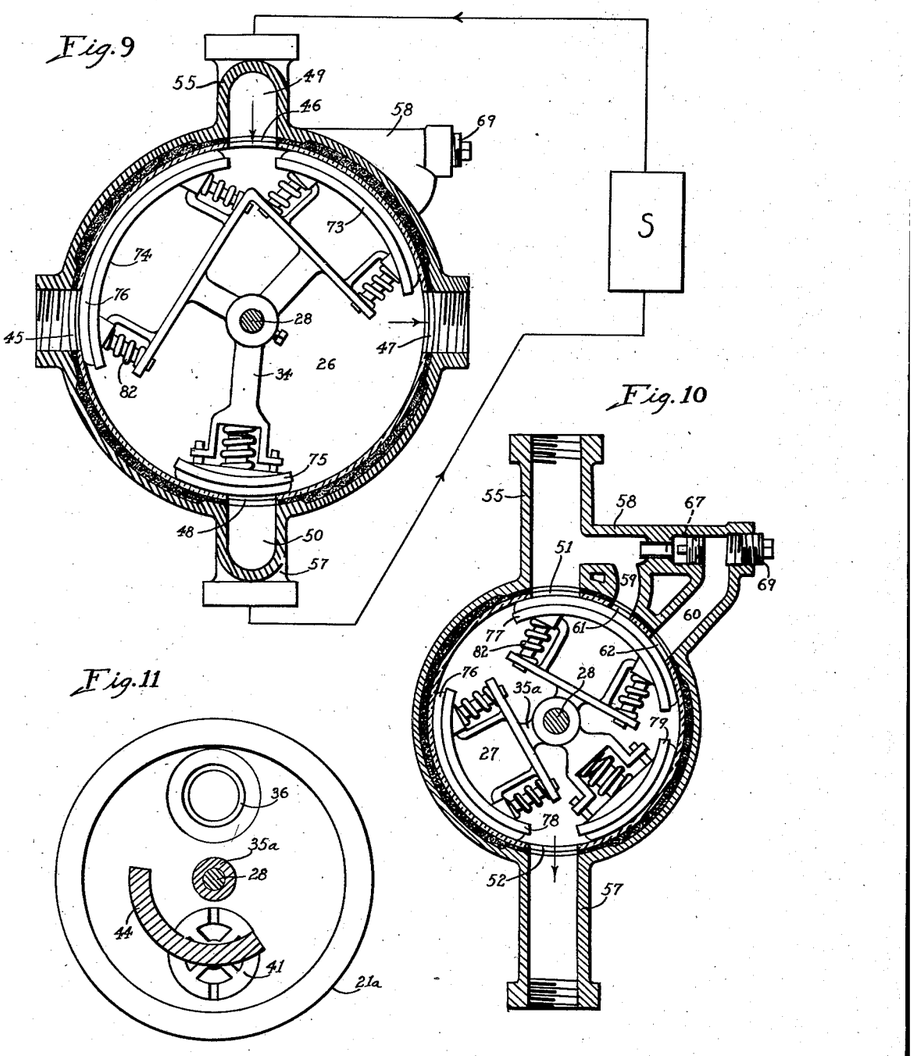
Figs. 9, 10, and 11 are views like Figs. 6, 7, and 8, respectively, but showing the valve in backwash position.

During backwashing, as illustrated in Figs. 9, 10, and 11, the incoming raw water from the pipe 36 entering chamber 27 leaves the valve through the port 52 and is conducted through pipe 56 (Fig. 2) into the bottom of the softener tank S for passage upwardly through the bed of water softening material to break up the bed, as stated before, and wash out the silt deposit on the top of the bed. The water leaving the top of the tank S is conducted back to the valve through pipe 54 (Fig. 2) and enters chamber 26 through port 46 and is discharged from the chamber through the port 47, being conducted through the drain pipe 53 (Figs. 1 and 3) to the sewer or other waste receptacle. During the backwash, the cam 44, as indicated in Fig. 11, holds the by-pass valve 40 open so that raw water can be by-passed to the service pipe 39 through the by-pass connection 38 (Fig. 3), should there be a demand for water during the time the backwash occurs. In this position of the valve, the shoe 77 closes the ports 51, 61, and 62, and the shoe 74 closes the port 45, and the shoe 75 closes the port 46. After a predetermined amount of water has been passed through the bed at a fairly rapid rate, the bed is ready for brining.

Figures 12, 13, 14:
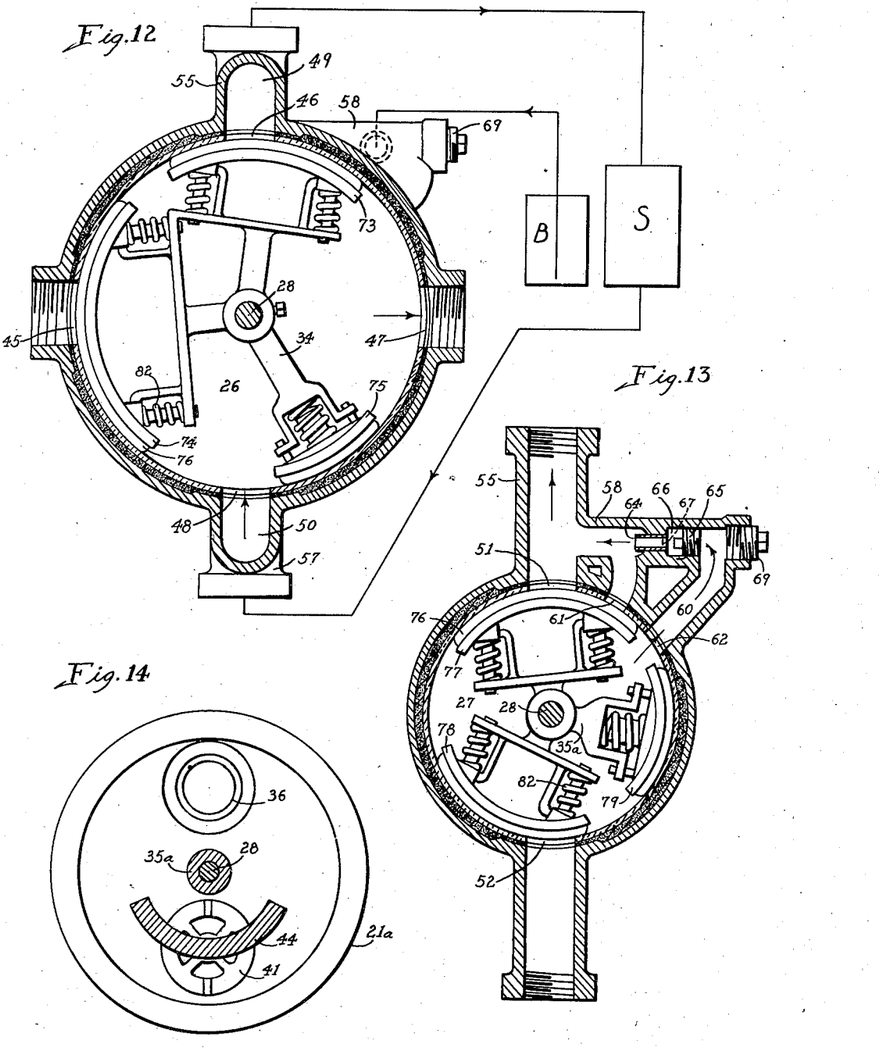
Figs. 12, 13, and 14 correspond to Figs. 6, 7, and 8, but show the valve in the brine position.

In brining, the valve is in the position shown in Figs. 12, 13, and 14. The incoming raw water from the pipe 36 enters the chamber 27 and flows out through the port 62 through the passage 60 and through the ejector nozzle 65, so as to siphon brine from the brine tank B and carry it, mixed with the water, into the top of the softener tank S for passage downwardly through the bed of water softening material for regeneration of the latter. The brine is supplied to the chamber 66 from the brine tank B, and the water discharged from the ejector nozzle 65 through the nozzle 64 at a fast rate draws the brine from the brine tank into the chamber 66 and carries it with the water out through the pipe 54 into the top of the softener S. The spent brine leaving the bottom of the softener tank S is conducted through the pipe 56 back to the valve and enters the chamber 26 through the port 48, and is conducted to the drain through the port 47 and pipe 53. During this operation, the ports 51 and 61 are closed by the shoe 77 and the port 52 is closed by the shoe 78, as shown in Fig. 13. The port 45 is closed by the shoe 74 and the port 46 is closed by the shoe 73. The by-pass valve 40 during this operation is held open by the cam 44, as indicated in Fig. 14. After a predetermined amount of brine has been used, sufficient for the regeneration of the bed of water softening material, the bed must be rinsed to remove all traces of brine and liberated calcium and magnesium from the bed.

Figures 15, 16, 17:
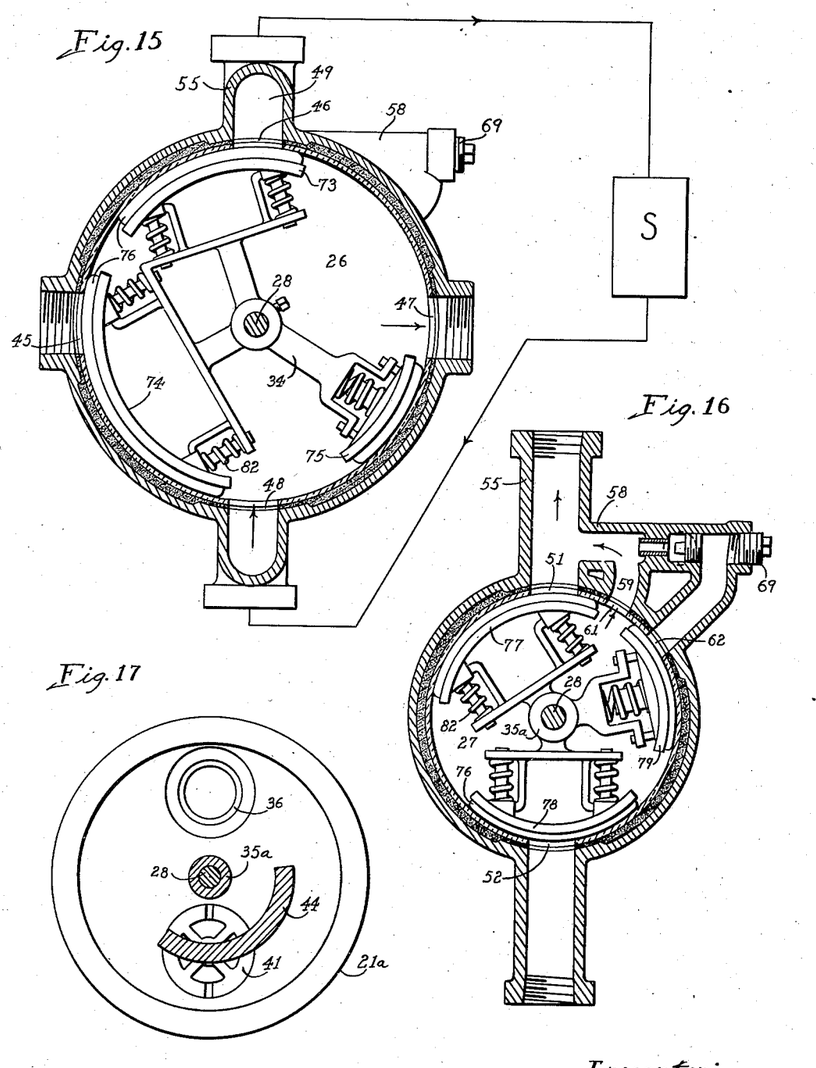
Figs. 15, 16, and 17 are other views similar to Figs. 6, 7, and 8, but showing the valve in the rinse position.

During rinsing, the valve is in the position shown in Figs. 15, 16, and 17. The incoming raw water from the pipe 36 enters the chamber 27 and is conducted through the port 61 and passage 59 out through the pipe 54 into the top of the softener tank S for passage downwardly through the bed of water softening material, so as to clear the head space in the tank of brine and rinse the bed thoroughly, as well as the space therebeneath in the tank. The rinse water leaving the bottom of the tank S is conducted back to the valve through the pipe 56 and enters the chamber 26 through the port 48, and is conducted to the drain through the port 47 and pipe 53. In this operation, the by-pass valve is again held open by the cam 44, as shown in Fig. 17, so that hard water may be by-passed to the service system. During this operation, the port 51 is held closed by the shoe 77, the port 62 is held closed by the shoe 79, and the port 52 is held closed by the shoe 78, as illustrated in Fig. 16. Also during this operation, the port 45 is held closed by the shoe 74 and the port 46 is held closed by the shoe 73, as illustrated in Fig. 15. The rinse flow is continued until a predetermined amount of water has passed through, or until the water discharged to the drain tests soft. The valve is then moved to the softening or service position, and the cycle just described is repeated.

It should be evident from the foregoing description and from a study of Fig. 1 that although I have illustrated the different positions of the valve so as to provide full port openings, I may change the different positions clockwise or counter-clockwise, as desired, and accordingly obtain the desired regulation of flow. For instance, if the water main pressure is such that with a full port opening, the flow of water in backwash position, for example, (see Figs. 9 and 10) causes a loss of mineral through the drain port 47, the "wash" index mark 33 could be reset in a counter-clockwise direction the desired number of degrees to uncover less of the port 52 and accordingly reduce the flow of water through the valve. The same method can be used to regulate the flow through the port 62 during brining (see Fig. 13), and through port 61 in rinsing (see Fig. 16), and through port 51 during softening operation (see Fig. 6). It is also apparent from a study of the drawings that either of the spiders 34 and 35 may be adjusted rotatably with respect to the shaft 28 independently of the other spider to obtain whatever operating characteristics may be desired and any predetermined desired regulation of flow, within the limits of the structure. This, of course, is a distinct advantage over other multi-port or so-called solo valves. A further advantage of the present construction lies in the fact that water can be cut off completely from the chamber 26 and from the softener tank by turning the shaft 28 in a counter-clockwise direction a certain distance past the service position, illustrated in Figs. 6 and 7. While the water is shut off, repairs can be made to the softener—the mineral or gravel bed may be relaid, for example—or repairs can be made to valves in the service system, or pipes may be replaced or altered in the service system.

It is believed the foregoing description conveys a good understanding of the objects and advantages of my invention. The appended claims have been drawn to cover all legitimate modifications and adaptations.

I claim:

1. In a multiple port valve, a hollow generally cylindrical body member having ports provided in the cylindrical wall thereof in two spaced substantially parallel planes extending transversely with respect to said body member, a partition wall in said body member between the two sets of ports defining two chambers, one of which communicates with the one set of ports and the other with the other set of ports, rotary spider members in said chambers carrying circumferentially spaced, separate, arcuate-faced valve shoe means for slidable sealing engagement with the cylindrical wall of the chambers, spring means for urging said valve shoe means outwardly individually relative to the spiders into tight sealing engagement with said ported cylindrical wall covering and closing selected ports, means for turning the spider members, the wall of said body member in each of said chambers including a ported cylindrical liner sleeve of non-metallic material inserted in said body member having its ports registering with the body ports, said sleeve having a smooth inner surface, arcuate facing pads of gasket material on said valve shoes for slidable sealing contact on the smooth inner surface of said sleeve, and a removable closure plate forming an end wall on said body member for each of said chambers.

2. In a multiple-port valve, comprising a hollow generally cylindrical body member having ports provided in the cylindrical wall thereof, and a rotary spider member in said body member having one or more generally T-shaped arms adapted to support on the cross-portions thereof valve shoes relative to the ports in said cylindrical wall, one or more elongated arcuate valve shoes, elongated in a direction circumferentially with respect to said cylindrical wall, for slidable sealing engagement with said wall, and means for mounting the opposite end portions of said shoes on the opposite end portions of said cross-portions with freedom for substantially radial movement relative to said wall, said means including spring means active between the ends of the cross-portions and the ends of the shoes to urge the shoes outwardly individually relative to the spider into tight sealing engagement with said cylindrical wall.

3. In a multiple-port valve, comprising a hollow generally cylindrical body member having ports provided in the cylindrical wall thereof, and a rotary spider member in said body member having one or more generally T-shaped arms adapted to support on the radially outer cross-portions thereof valve shoes relative to the ports in said cylindrical wall, one or more elongated arcuate valve shoes, elongated in a direction circumferentially with respect to said cylindrical wall, for slidable sealing engagement with said wall, gasket facing material on each of said shoes for contact with the ported cylindrical wall, and means for mounting the opposite end portions of said shoes on the opposite end portions of said cross-portions with freedom for substantially radial movement relative to said wall, said means including spring means active between the ends of the cross-portions and the ends of the shoes to urge the shoes outwardly individually relative to the spider into tight sealing engagement with said cylindrical wall, said adjustable mounting and spring pressure on said shoes compensating for uneven wear of said gasket material.

4. In a multiple port valve, a hollow generally cylindrical body member having two sets of ports provided in the cylindrical wall thereof in two planes, said body member having means providing one or more passages interconnecting certain of said ports independently of the valve means within said body member, ported cylindrical liner sleeve means of non-metallic material in said body member having the ports thereof registering with the body ports, said liner sleeve means having a smooth inner surface adapted for the sliding engagement thereon of valve shoes, a rotary shaft in said body member carrying two spiders on which are mounted circumferentially spaced, separate, arcuate-faced valve shoes for slidable sealing engagement with the ported cylindrical wall of the body member, spring means for urging said valve shoes outwardly individually relative to the spider into tight sealing engagement with said cylindrical wall covering and closing selected ports, said spiders being rotatably adjustable on the shaft independently of one another, means for securing the spiders to the shaft in adjusted positions, and means for turning the shaft.

5. In a multiple port valve, a hollow generally cylindrical body member having two sets of ports provided in the cylindrical wall thereof in two planes, there being a plurality of circumferentially spaced ports in each set, said body member having means providing one or more passages interconnecting certain of said ports independently of the valve means within said body member, a rotary shaft in said body member carrying two spiders on which are mounted circumferentially spaced, separate, arcuate-faced valve shoes of gasket material for slidable sealing engagement with the ported cylindrical wall of the body member, spring means for urging said valve shoes outwardly individually relative to the spider into tight sealing engagement with said cylindrical wall covering and closing selected ports, certain ports in at least one of said sets being closely spaced and of a size in relation to the arcuate length of the cooperating valve shoe to permit closure of more than one port with said shoe in a predetermined position of rotation of the shaft, said spiders being rotatably adjustable on the shaft independently of one another, means for securing the spiders to the shaft in adjusted positions, and means for turning the shaft.

6. In a multiple port valve, a hollow generally cylindrical body member having ports provided in the cylindrical wall thereof in two spaced substantially parallel planes extending transversely with respect to said body member, a partition wall in said body member between the two sets of ports defining two chambers, one of which communicates with the one set of ports and the other with the other set of ports, said body member having means providing passages interconnecting a certain port or ports of one chamber with a certain port or ports of the other chamber independently of the valve means within said body member, a ported cylindrical liner sleeve of non-metallic material in each of said chambers having the ports thereof registering with the body ports, said sleeves having smooth inner surfaces adapted for sliding contact therewith of valve shoe means, a rotary shaft, spider members on said shaft in said chambers carrying circumferentially spaced, separate, arcuate-faced valve shoe means for slidable sealing engagement with the cylindrical wall of the chambers, spring means for urging said valve shoe means outwardly individually relative to the spiders into tight sealing engagement with said ported cylindrical wall covering and closing selected ports, said spiders being rotatably adjustable on the shaft independently of one another, means for securing the spiders to the shaft in adjusted positions, and means for turning the shaft, said valve shoes being elongated in a direction circumferentially with respect to said body member, and being so arranged with respect to one another and with reference to the ports to permit complete stoppage of flow through the valve in a predetermined position of rotary adjustment of the spider members.

7. In a multiple port valve, a hollow generally cylindrical body member having ports provided in the cylindrical wall thereof in two spaced substantially parallel planes extending transversely with respect to said body member, a partition wall in said body member between the two sets of ports defining two chambers, one of which communicates with the one set of ports and the other with the other set of ports, there being a plurality of circumferentially spaced ports in each set, said body member having means providing passages interconnecting a certain port or ports of one chamber with a certain port or ports of the other chamber independently of the valve means within said body member, a rotary shaft, spider members on said shaft in said chambers carrying circumferentially spaced, separate, arcuate-faced valve shoe means of gasket material for slidable sealing engagement with the cylindrical wall of the chambers, spring means for urging said valve shoe means outwardly individually relative to the spiders into tight sealing engagement with said ported cylindrical wall covering and closing selected ports, certain ports in at least one of said sets being closely spaced and of a size in relation to the arcuate length of the cooperating valve shoe to permit closure of more than one port with said shoe in a predetermined position of rotation of the shaft, said spiders being rotatably adjustable on the shaft independently of one another, means for securing the spiders to the shaft in adjusted positions, and means for turning the shaft, said valve shoes being elongated in a direction circumferentially with respect to said body member, and being so arranged with respect to one another and with reference to the ports to permit complete stoppage of flow through the valve in a predetermined position of rotary adjustment of the spider members.

ANDREW KROMHOUT.